June 20, 1944.    I. STREIT    2,352,135

BAKING OVEN

Filed April 15, 1942

INVENTOR.
IRVING STREIT
BY Irving Seidman
ATTORNEY.

Patented June 20, 1944

2,352,135

UNITED STATES PATENT OFFICE 2,352,135

BAKING OVEN

Irving Streit, New York, N. Y., assignor to Aron Streit, Inc., a corporation of New York Application April 15, 1942, Serial No. 439,032

3 Claims. (Cl. 107—4)

This invention relates to improvements in machinery for the baking of matzoth.

More particularly, it is an object of my invention to provide for improved equipment that will thoroughly bake a continuous flat ribbon of unleavened dough. Heretofore, in the baking of matzoth, the upper part of the continuous flat ribbon of unleavened dough was more thoroughly baked while the reverse side was lighter in appearance and not as well baked as the upper side.

It is well known in the art of matzoth baking machinery that the continuous flat ribbon of unleavened dough is fed into the baking ovens upon a continuous wire mesh conveyor. During the passage of the ribbon of dough through the long baking ovens, the heat and the reflected heat in the chamber of the oven bake the upper side of the ribbon of dough more thoroughly than the underneath side. I have overcome this objection by providing a roller across the ribbon of dough of the proper weight positioned where the ribbon of dough is still in a pliable state and at the beginning of the baking chamber. The pressure of this roller upon the continuous ribbon of dough causes the ribbon of dough to be pressed slightly upon the continuous wire mesh conveyor so that the accumulated heat of the wire conveyor acts in the nature of a toaster in order to bake the matzoth better than heretofore.

For a fuller understanding of the nature and objects of my invention, reference is had to the following detailed description in connection with the accompanying drawing, in which.

Figure 1:
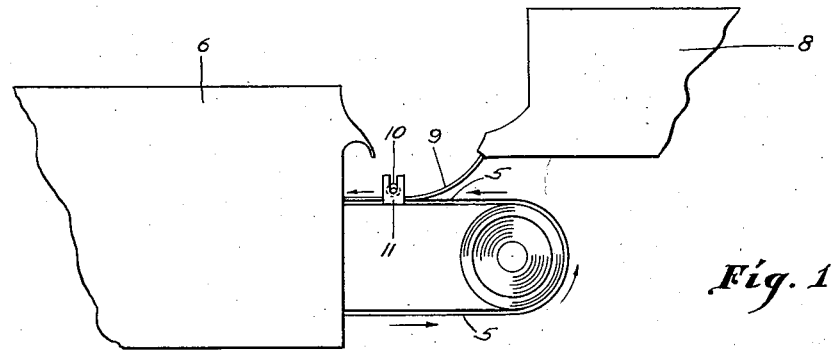
Fig. 1 represents a diagrammatic view of an oven and conveyor showing the approximate position of my roller for pressing the ribbon of dough lightly upon the wire mesh conveyor.
Figure 2:
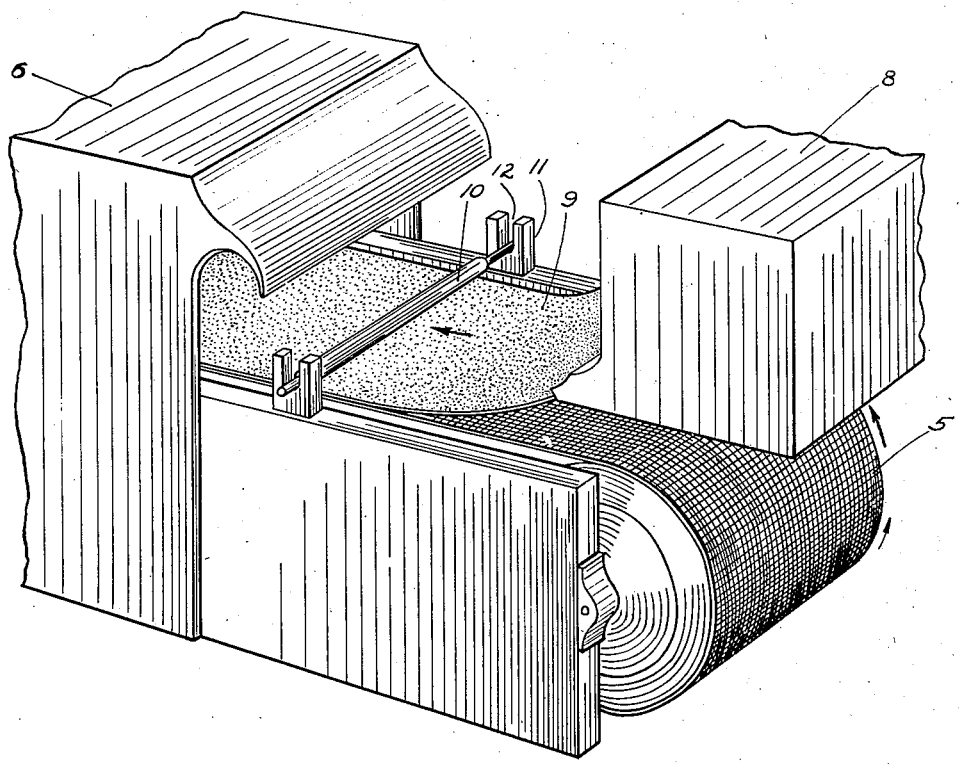
Fig. 2 is a perspective view of the oven showing the roller and my preferred type of holding means for the roller to permit vertical movement.

Referring to the drawing, numeral 5 represents a continuous wire mesh conveyor passing through a long baking oven 6 which is heated from below by heaters (not shown) which may be either electric, gas or oil burning. At the forepart of the oven, there is a dough depositing tank 8 containing a dough mix which is fed upon the wire mesh conveyor 5 in the form of a continuous wide ribbon of dough 9 at a point before the entrance of the baking oven 6. A long narrow roller 10, held by brackets 11 having an open groove 12, passes across the ribbon of dough 9, which is of sufficient weight to press the ribbon of dough 9 in its soft pliable state upon wire mesh conveyor 5 so that the ribbon of dough 9 rests lightly upon wire mesh conveyor 5 without forcing the dough into the openings of the wire mesh conveyor 5. Upon movement of the ribbon of dough 9 through the baking oven 6, the wire mesh conveyor becomes sufficiently heated to provide additional heat to the underneath side of the ribbon of dough 9 so that the underneath side will become well baked; that is, the underneath side will be just as well baked as the upper side of the ribbon of dough 9. Since the heat rises in the oven 6 and is reflected from the upper part of the oven, the upper portion of the ribbon of dough 9 usually bakes better and faster than the underneath side. By providing for the ribbon of dough to contact the continuous wire mesh conveyor, the accumulated heat of the wire mesh conveyor 5 provides the necessary additional heat to bake the underneath side of the ribbon of dough 9 just as well as the top side. The ribbon of dough 9 is pressed upon the wire mesh conveyor 5 by metal roller 10 with just enough pressure so that in passing through baking oven 6 the ribbon of dough 9 in baked form is not pressed into the openings of wire mesh conveyor 5 in order to make it difficult to discharge the matzoth at the opposite end. When the baked matzoth appears at the opposite end of the oven after it has been baked, it contains slight brown spots made by the wire strands of the conveyor. The baked sheet of matzoth is then broken into predetermined sizes ready for packing into cartons.

It is obvious that some changes and modifications may be made in the details of construction without departing from the general spirit of the invention, as set forth in the appended claims.

I claim:

1. In combination, a dough depositing chamber with a matzoth baking oven having a continuous wire mesh conveyor running horizontally therethrough, said dough depositing chamber having means for depositing an endless ribbon of dough upon said continuous wire mesh conveyor which passes longitudinally and horizontally through said oven, said continuous wire mesh conveyor having operatively associated therewith pressing means at the forepart of said oven in the form of a transversely arranged pressing roller of the same width as the conveyor and located above the continuous wire mesh conveyor and said endless ribbon of dough, said roller being arranged to press said endless ribbon of dough upon said continuous wire mesh conveyor.

2. In combination, a baking oven for baking matzoth with a wire mesh continuous conveyor travelling longitudinally in a forward horizontal path through said oven, a transverse pressing roller at the fore part of said oven, said roller extending transversely the full width and above said wire mesh conveyor and spaced so as to press a continuous ribbon of dough deposited upon the fore part of said moving wire mesh conveyor on to said wire mesh conveyor.

3. In combination, a matzoth baking oven having a continuous wire mesh conveyor for conveying a ribbon of dough, said conveyor travelling longitudinally in a forward horizontal path with a transverse pressure roller extending the full width and above said continuous wire mesh conveyor and spaced to exert a predetermined pressure upon said ribbon of dough as it is deposited upon said moving conveyor, means for maintaining said roller in vertical movable relationship to said wire mesh continuous conveyor.

IRVING STREIT.